US010206486B2

(12) United States Patent
Zimmerman

(10) Patent No.: US 10,206,486 B2
(45) Date of Patent: *Feb. 19, 2019

(54) FAN BASE AND MIRROR SUPPORT APPARATUS

(71) Applicant: Barbara D. Zimmerman, St. Louis, MO (US)

(72) Inventor: Barbara D. Zimmerman, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,035

(22) Filed: Feb. 17, 2017

(65) Prior Publication Data

US 2017/0181528 A1 Jun. 29, 2017

Related U.S. Application Data

(63) Continuation-in-part of application No. 14/280,046, filed on May 16, 2014, now Pat. No. 9,605,854, (Continued)

(51) Int. Cl.
| | |
|---|---|
| *A45D 42/00* | (2006.01) |
| *A45D 42/08* | (2006.01) |
| *A45D 42/10* | (2006.01) |
| *A45D 42/14* | (2006.01) |
| *A45D 42/16* | (2006.01) |

(Continued)

(52) U.S. Cl.
CPC .............. *A45D 42/10* (2013.01); *A45D 20/00* (2013.01); *A45D 42/00* (2013.01); *A45D 42/08* (2013.01); *A45D 42/14* (2013.01); *A45D 42/16* (2013.01); *F04D 19/002* (2013.01); *F04D 25/06* (2013.01); *F04D 29/524* (2013.01); *F04D 29/646* (2013.01); *G02B 7/182* (2013.01);

(Continued)

(58) Field of Classification Search
CPC ........ A45D 42/00; A45D 42/08; A45D 42/10; A45D 42/14; A45D 42/16; F21V 33/004
See application file for complete search history.

(56) References Cited

U.S. PATENT DOCUMENTS

| 1,382,215 | A | * | 6/1921 | Morris | .................... F21V 14/00 |
| | | | | | 314/28 |
| 3,578,000 | A | * | 5/1971 | Horecky | ................ A45D 20/18 |
| | | | | | 132/315 |

(Continued)

FOREIGN PATENT DOCUMENTS

JP 2004201709 A * 7/2004

*Primary Examiner* — Audrey K Bradley
(74) *Attorney, Agent, or Firm* — Dale J. Ream

(57) ABSTRACT

A fan base and mirror apparatus for use in cooling a user's neck and torso while the user is positioned adjacent the apparatus includes a base member having upper and lower portions. A fan member is pivotally coupled to the base member and selectively movable between upward and downward directed configurations. An upstanding support member is coupled to the upper portion of the base member and extends upwardly therefrom. A mirror is operatively coupled to an upper end of the support member such that the mirror is vertically displaced from the fan member, the mirror being movable between straight and tilted configurations. The apparatus includes a light coupled to the mirror and electrically connected to a power source, the light configured to illuminate the mirror when energized.

14 Claims, 9 Drawing Sheets

Related U.S. Application Data which is a continuation-in-part of application No. 13/608,552, filed on Sep. 10, 2012, now Pat. No. 8,746,917.

(60) Provisional application No. 61/626,318, filed on Sep. 23, 2011.

(51) Int. Cl.
| | |
|---|---|
| *F21V 33/00* | (2006.01) |
| *F04D 19/00* | (2006.01) |
| *F04D 29/52* | (2006.01) |
| *F04D 29/64* | (2006.01) |
| *F04D 25/06* | (2006.01) |
| *G02B 7/182* | (2006.01) |
| *A45D 20/00* | (2006.01) |
| *A45C 9/00* | (2006.01) |
| *A45C 11/16* | (2006.01) |

(52) U.S. Cl.
CPC ........... *A45C 9/00* (2013.01); *A45C 11/16* (2013.01); *F21V 33/004* (2013.01)

(56) References Cited

U.S. PATENT DOCUMENTS

| | | | | |
|---|---|---|---|---|
| 3,772,508 | A * | 11/1973 | Zapater | A45D 42/00 312/224 |
| 4,653,201 | A * | 3/1987 | Seaman | A45D 20/16 219/219 |
| 5,090,300 | A * | 2/1992 | Berenstein | A47G 1/02 359/838 |
| 6,158,877 | A * | 12/2000 | Zadro | A45D 42/10 362/135 |
| 7,942,536 | B1 * | 5/2011 | Johnson | G02B 5/09 359/854 |
| 8,746,917 | B2 * | 6/2014 | Zimmerman | A45D 42/00 219/220 |
| D738,118 | S * | 9/2015 | Gyanendra | A45D 42/10 D6/300 |
| 9,179,752 | B2 * | 11/2015 | Kim | A45C 5/005 |
| 2004/0047052 | A1 * | 3/2004 | Zadro | A45D 42/16 359/855 |
| 2010/0073792 | A1 * | 3/2010 | Limjoco | A45D 42/18 359/877 |
| 2010/0118520 | A1 * | 5/2010 | Stern | A45D 42/10 362/135 |

\* cited by examiner

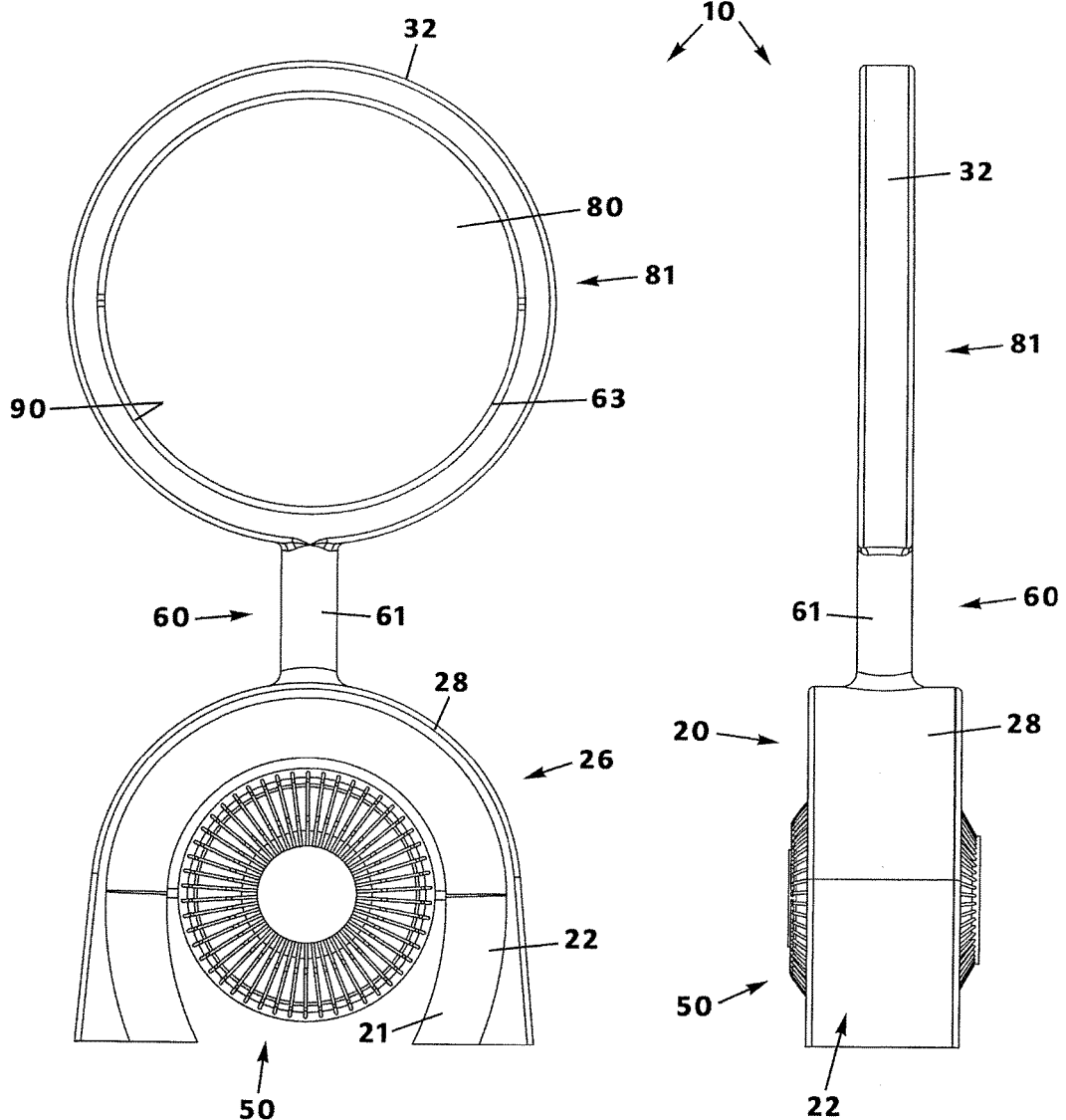

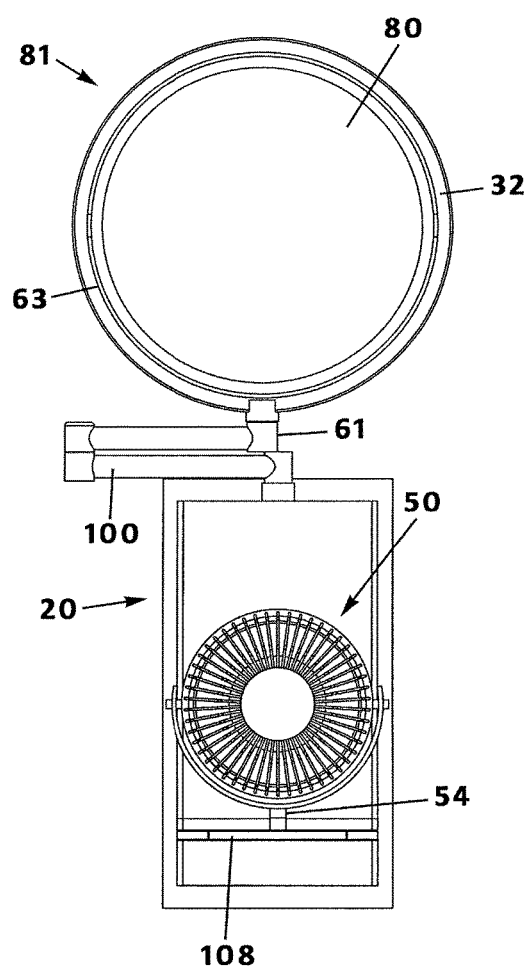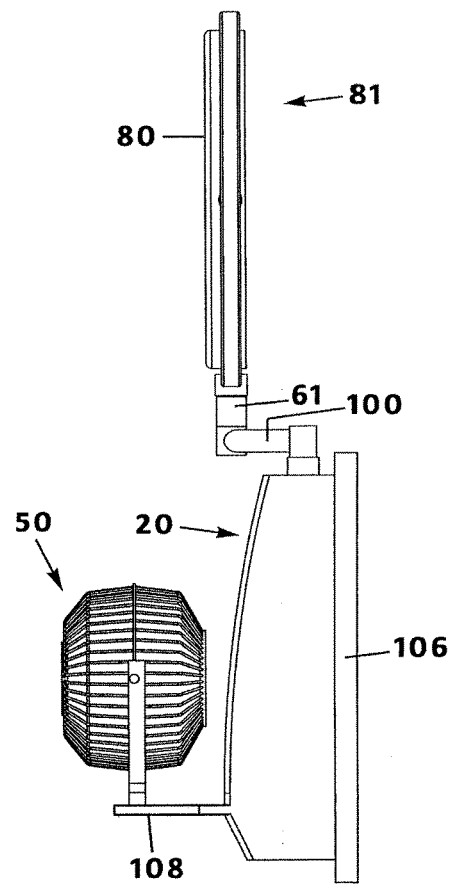
Fig. 8                    Fig. 9

US 10,206,486 B2

FAN BASE AND MIRROR SUPPORT APPARATUS

REFERENCE TO RELATED APPLICATIONS

This non-provisional patent application claims the benefit of non-provisional application Ser. No. 14/280,046 filed on May 16, 2014 titled Fan Support and Storage Apparatus which claims the benefit of non-provisional application Ser. No. 13/608,552 filed on Sep. 10, 2012 (now US Patent), titled Fan Base with Illuminated Mirror and Fan which claims the benefit of provisional application Ser. No. 61/626,318 filed on Sep. 23, 2011, titled Fan Base, all of which are incorporated herein by reference in their entirety.

BACKGROUND OF THE INVENTION

This invention relates generally to personal fan and mirror devices. More particularly, the present invention relates to a fan support and mirror apparatus that may be mounted in a bathroom or wherever a woman applies make-up or arranges her hair directly after showering, the apparatus including a fan assembly and mirror on a vertical tower framework.

A woman often applies makeup using a makeup mirror device in the bathroom immediately after showering. A problem frequently encountered with this progression of events is that the bathroom may be very hot and steamy. This can lead to a woman perspiring excessively after already showering. Further, middle aged women may also experience hot flashes that simply add to an already uncomfortable environment. In either instance, a woman may have to seek a cooler environment for a period of time which may result in being late for work or another appointment.

Therefore, it would be desirable to have a fan support and illuminated mirror apparatus that includes a fan assembly that may be selectively directed away from a user's face and eyes while still blowing air on a user's torso. In addition, it would be desirable to have a fan support and illuminated mirror apparatus in which the fan assembly is shielded so that the user's hair or other debris are not contacted by the fan blades.

SUMMARY OF THE INVENTION

A fan base and illuminated mirror apparatus for use in cooling a user's neck and torso while the user is positioned adjacent the apparatus according to the present invention includes a base member having upper and lower portions. A fan member is pivotally coupled to the base member and selectively movable between upward and downward directed configurations. An upstanding support rod is coupled to the upper portion of the base member and extends upwardly therefrom. A mirror is operatively coupled to an upper end of the rod such that the mirror is vertically displaced from the fan member, the mirror being pivotally movable between straight and tilted configurations. The apparatus includes a light coupled to the mirror and electrically connected to a power source, the light configured to illuminate the mirror when energized. The fan member does not discharge air into a user's eyes when the user is reflecting in the mirror and the fan member is at a downward configuration and the mirror is at a tilted configuration.

Therefore, a general object of this invention is to provide a fan base with fan and mirror configured to cool the neck and torso of a user while applying cosmetics using the mirror.

Another object of this invention is to provide a fan base with fan and mirror, as aforesaid, in which the mirror and fan are displaced from one another.

Still another object of this invention is to provide a fan base with fan and mirror, as aforesaid, in which the fan and mirror are directionally adjustable independent of one another.

A further object of this invention is to provide a fan base with fan and mirror, as aforesaid, in which the mirror and fan may be laterally offset from one another.

A still further object of this invention is to provide a fan base with fan and mirror, as aforesaid, that is easy to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2 is a front view of the fan base and mirror apparatus as in FIG. 1;

FIG. 3 is a side view of the fan base and mirror apparatus as in FIG. 1;

FIG. 8 is a front view of the fan base and mirror apparatus as in FIG. 7;

FIG. 9 is a side view of the fan base and mirror apparatus as in FIG. 7; and

DESCRIPTION OF THE PREFERRED EMBODIMENT

Figure 1:
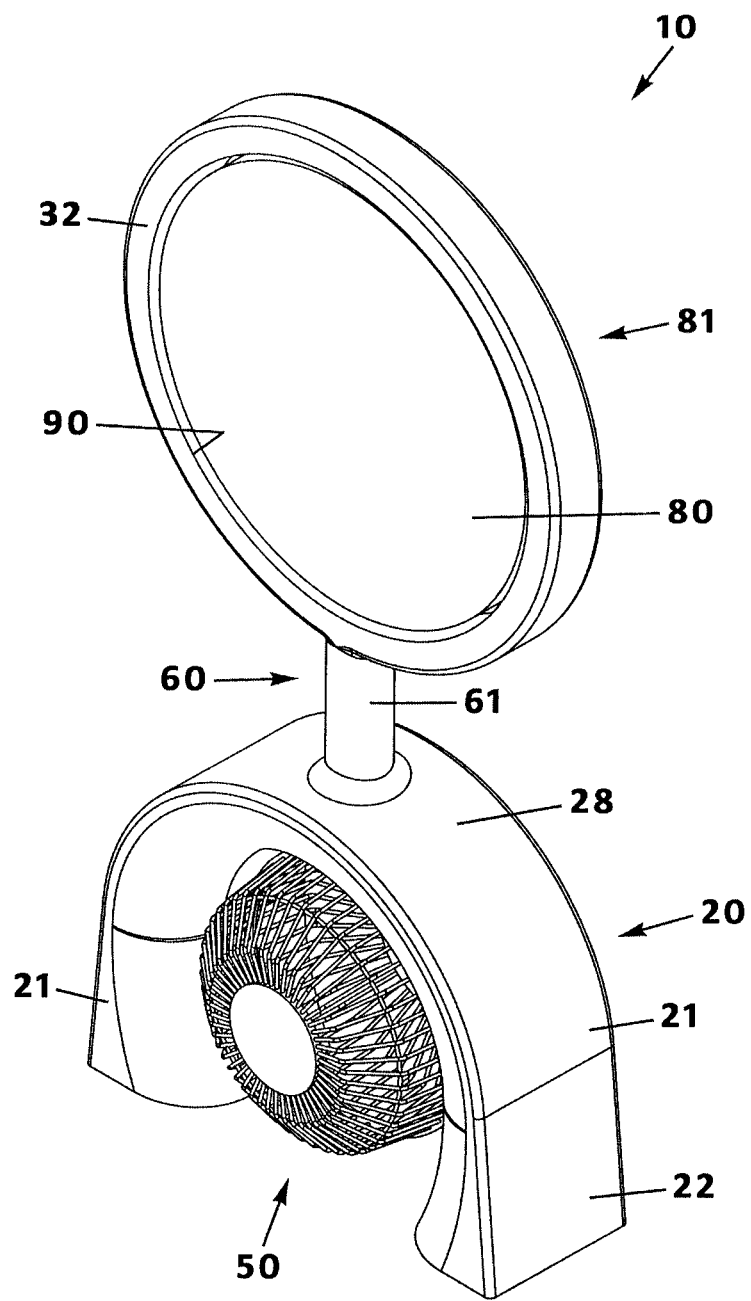
FIG. 1 is a perspective view of a fan base and mirror apparatus according to a preferred embodiment of the present invention.

A fan base and mirror support apparatus according to a preferred embodiment of the present invention will now be described with reference to FIGS. 1 to 10 of the accompanying drawings. The fan base apparatus 10 includes a base member 20, a fan member 50, a support member 60, a mirror 80, and a light 90 for selectively illuminating the mirror 80. The mirror 80 is displaced from the fan member 50 so that air is not discharged into the face of a user looking in the mirror 80, as will be described in more detail below.

Figure 10:
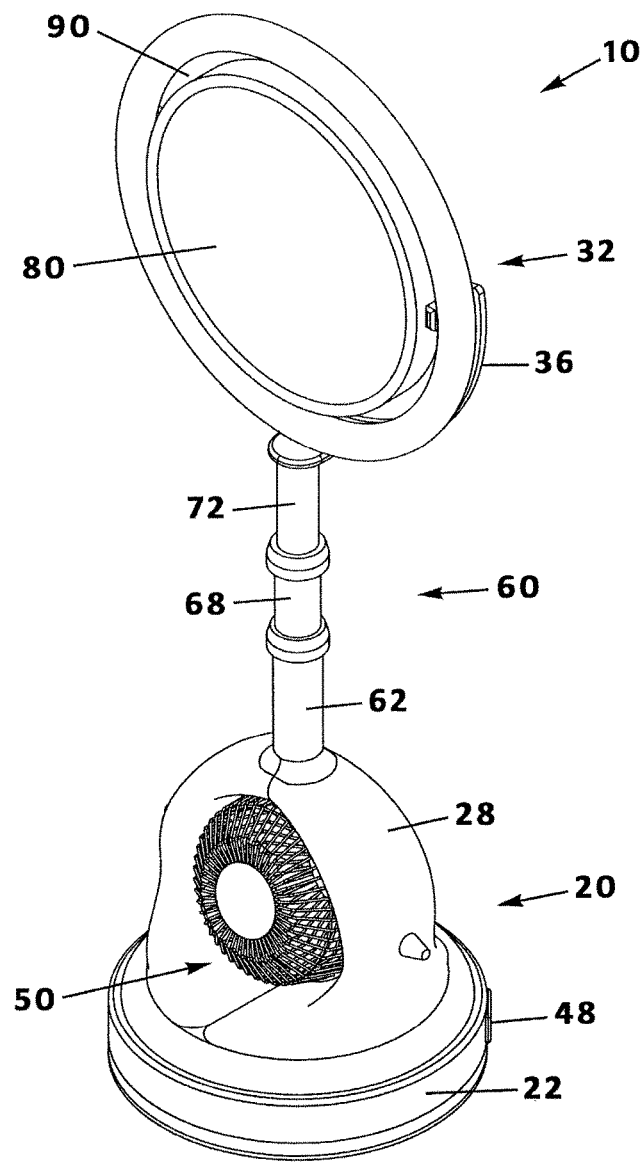
FIG. 10 is a perspective view of a fan base and mirror apparatus according to another embodiment of the present invention.

In an embodiment, the fan base apparatus 10 is primarily supported by a base member 20. More particularly, the base member 20 includes a lower portion 22 and an upper portion 28. Preferably, the lower portion 22 of the base member 20 may include a pair of legs 21 extending downwardly and away from the upper portion 28 in a generally inverted U-shaped or V-shaped configuration. The lower ends of respective legs 21 are configured to support the base member 20 and entire apparatus 10 atop a flat surface, such as a dressing table, restroom cabinet, vanity, or the like. It is understood that while the base member 20 is first illustrated as having a U-shaped configuration defining an open bottom (FIG. 1), it may also have a circular, square, or irregular configuration with a closed bottom (FIG. 10). Preferably, the bottom ends of the legs 21 or bottom surface of another configuration includes a non-skid material. It is understood that the lower portion 22 may be configured to be securely fastened to the support surface on which it rests, such as with screws or the like.

Figure 4:
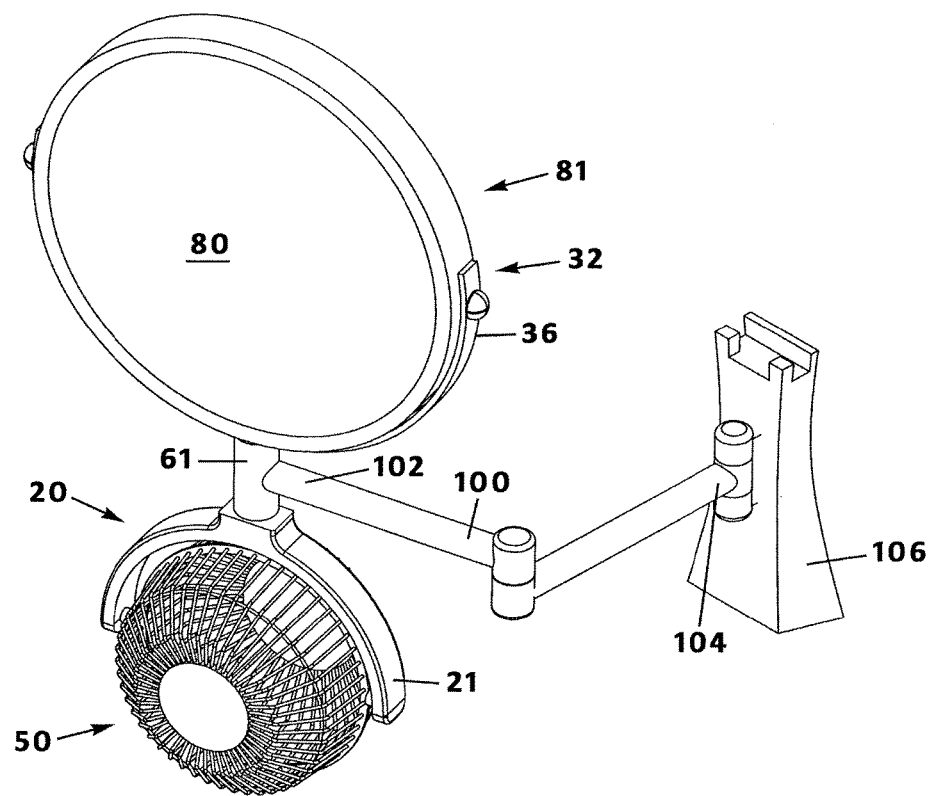
FIG. 4 is a perspective view of a fan base and mirror apparatus according to a wall mount embodiment, illustrated in an extended configuration.
Figure 4A:
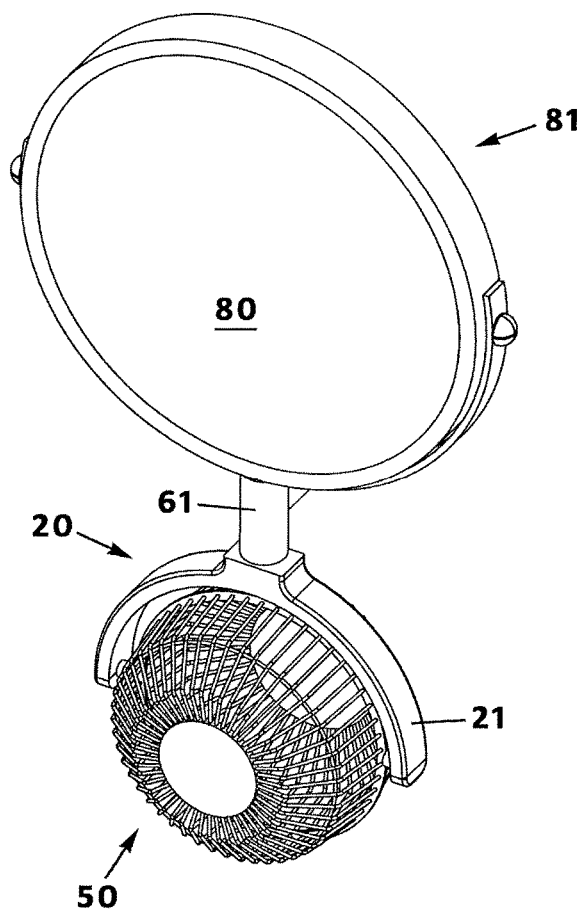
FIG. 4a is a front perspective view of a fan base and mirror apparatus according to a wall mount embodiment as in FIG. 4, illustrating the mounting member being a suction cup.
Figure 4B:
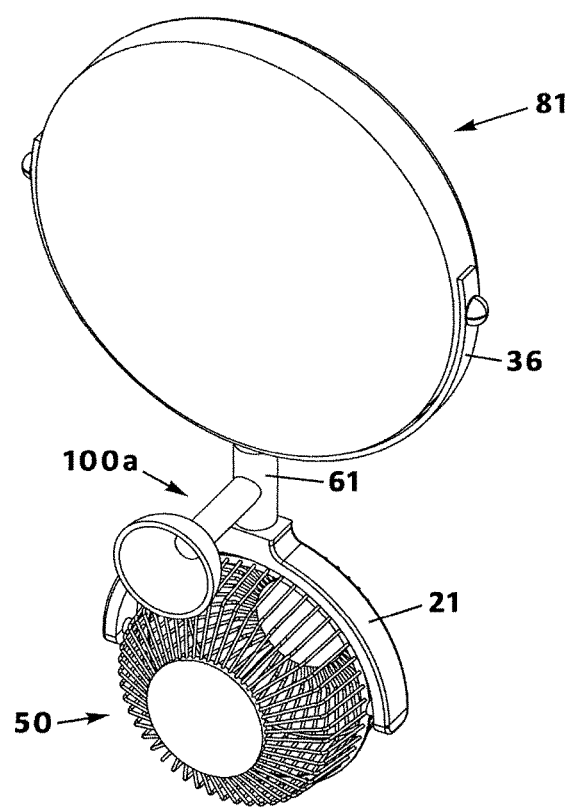
FIG. 4b is a rear perspective view of the fan base and mirror apparatus as in FIG. 4c.
Figure 5:
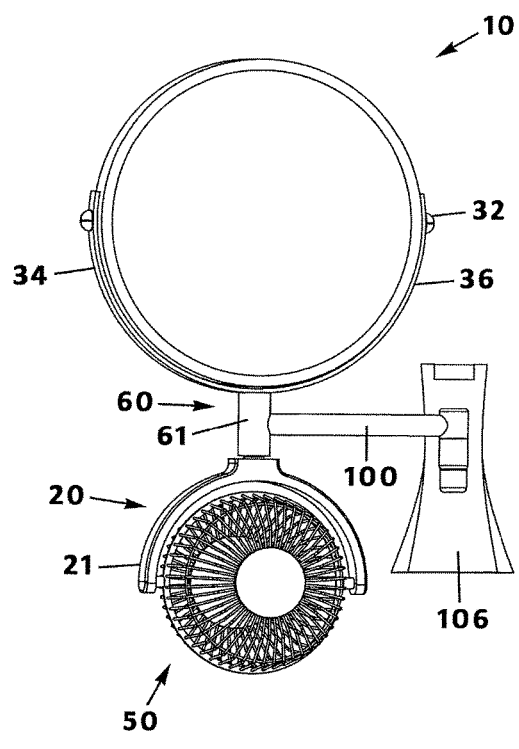
FIG. 5 is a front view of the fan base and mirror apparatus as in FIG. 4.
Figure 6:
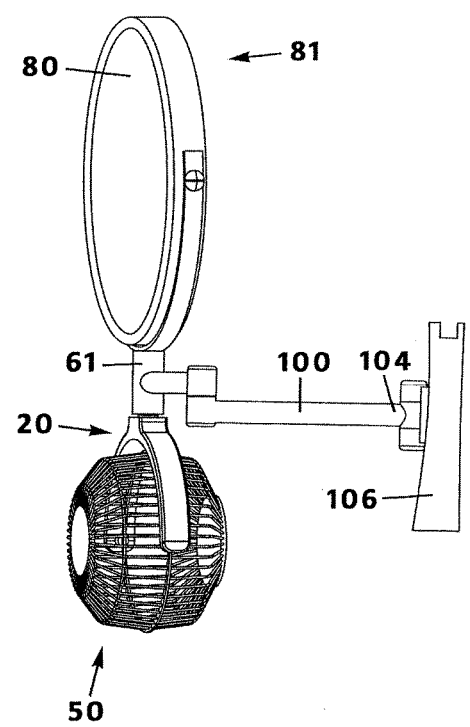
FIG. 6 is a side view of the fan base and mirror apparatus as in FIG. 4.

In an embodiment, the legs 21 may be truncated and not employed to rest upon a flat surface. Further, this embodiment includes a mounting arm 100 configured to mount the apparatus 10 to the wall of a wall or fixture thereon, such as to a bathroom wall (FIG. 4). The mounting arm 100 may have a proximal end 102 pivotally coupled to one of the base member 20 or support member 60. The pivotal coupling enables the base member 20—and, as a result, the fan member 50 and mirror assembly 81—to swivel from side to side as may be selectively urged by a user. In an embodiment, the base member 20 may be coupled to the support shaft 60 with a swivel coupling to facilitate the swivel movement (FIGS. 5-6).

Further, the mounting arm 100 may have a distal end 104 opposite the proximal end 102 and configured to be attached to a wall or wall mounting flange 106, the mounting arm 100 having a generally linear configuration therebetween. It is understood that the mounting arm 100 may include multiple segments for providing further extension away from the wall. Therefore, the mounting arm 100 is movable between (1) a retracted configuration in which its entire length is adjacent the base member 20 and the base member 20 is adjacent the wall and mounting flange 106 (FIGS. 7) and (2) a deployed configuration extending the apparatus 10 away from the wall (FIG. 4). Again, the mounting arm 100 may be coupled to the support member 60 (described below) rather than to the base member 20 in the same manner described above. In an embodiment disclosed in later, the mounting arm 100 is a suction cup numbered with reference numeral 100a.

At least one support member 60 extends upwardly from the base member 20 and, may include a support rod 61. In an embodiment, the support rod 61 may have a generally linear configuration with a predetermined and fixed length (FIG. 1). More particularly, the support member 60 may have a first end coupled to the upper portion 28 of the base member and a second end opposite the first end, the support rod 61 extending therebetween. The support member 60 may have an ergonomic configuration that is easy to grasp by a user who may grasp and position it at a desired location.

A mirror assembly 81 may be operatively coupled to the support member 60 and includes a mirror 80 that is pivotally movable to a desired tilted position. In the drawings, the mirror 80 is illustrated as being coupled to an upper end of the support rod 61 although attachment at other locations are also contemplated and would work (such as directly to the upper portion 28 of the base member 20. The mirror 80, of course, includes at least one reflective surface in which a user's likeness may be reflected.

In a preferred embodiment, the mirror assembly 81 may include a cradle having a complete circular configuration that defines a center void 63 (FIGS. 1-9). The mirror 80 may be pivotally coupled to inner surfaces of opposite side portions of the cradle with a fastener such as a pin so that the mirror 80 is selectively pivotal 360 degrees about an imaginary horizontal axis defined by the fastener. In respective embodiments, a mirror 80 may be situated on both a front surface and rear surface of the mirror assembly 81 or just on a front side. In another embodiment, the cradle may include a generally Y-shaped or U-shaped configuration defining an open upper end (not shown). In an embodiment, the mirror 80 may be fixedly attached to the cradle or atop the support member 60.

The mirror assembly 81 may include a light 90 configured to illuminate the reflective surface of the mirror 80. The light 90 may be coupled to the cradle of the mirror assembly 81 and not pivotal with the mirror 80 itself. For instance, the light 90 may be coupled to respective inner surfaces of the cradle or frame and, thus, displaced from the mirror 80. Alternatively, the light 90 may be positioned on an outer periphery of the mirror assembly 81.

The fan member 50 may include a pair of opposed fan fasteners (not shown) that define an imaginary horizontal axis extending between the legs 21 of the lower portion 22 of the base member 20. Inner surfaces of the legs 21 may also define holes or recessed areas or apertures complementary to the pair of fan fasteners. The fan member 50 may be pivotally coupled to the pair of fan fasteners so as to selectively rotate about a horizontal axis defined by the fan fastener for tilting the fan member 50 between upwardly and downwardly directed configurations. It is understood that the pair of fan fasteners may be rods, pins, or the like. The fan member 50 may be pivotally tilted upwardly if a user wishes air to be discharged toward her face or pivoted downwardly if a user wishes air to be discharged toward the torso of her body, e.g. her neck and chest area.

Figure 7:
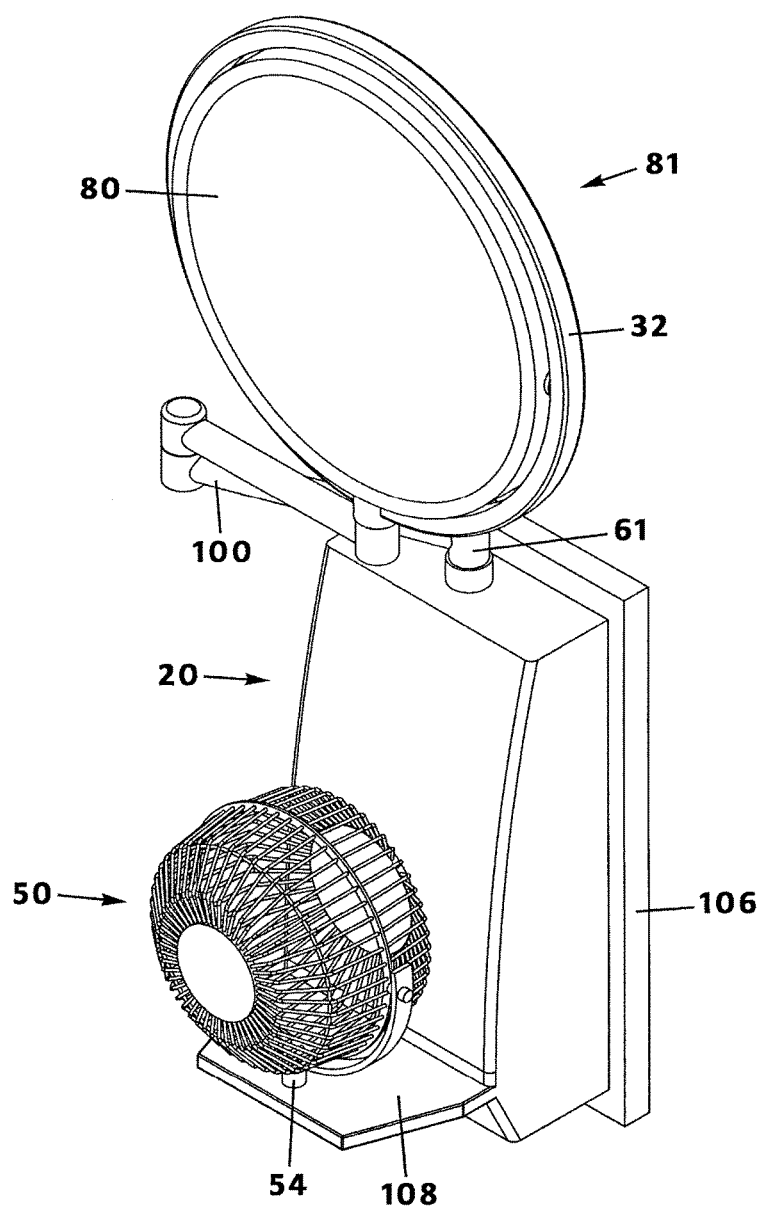
FIG. 7 is a perspective view of a fan base and mirror apparatus according to another embodiment of the present invention.

In an embodiment shown in FIGS. 7-9, the base member 20 may have a block or rectangular configuration that nests against or is adjacent to the wall mount flange 106 at the retracted configuration of the mounting arm 100. In this embodiment, the wall mount flange 106 may include a platform 108 upon which the fan member 50 may be coupled. In this embodiment, the fan member 50 may include a U-shaped cradle 52 mounted on a post 54 and configured such that the fan member 50 may swivel side to side on the post 54 and to be tilted up or down.

In another embodiment (FIG. 10), the support member 60 may be a length-adjustable or telescopic rod 61. In this embodiment, the length-adjustable rod 61 extends upwardly and connects the base member 20 to the mirror assembly 81 and light 90. More particularly, the length-adjustable rod 61, which may be referred to merely as "the rod", may include a first rod portion 62, a second rod portion 68, and a third rod portion 72 although the rod 60 may include more or less rod portions in various embodiments. The first rod portion 62 may include a lower end attached to the upper end of the base member 20 and an opposed upper end, the upper end defining an open configuration and the first rod portion 62 defining an interior area. The second rod portion 68 has a configuration that is complementary to that of the first rod portion 62, the second rod portion 68 being operatively coupled to the first rod portion 62 and movable through the open upper end of the first rod portion 62 between a retracted configuration substantially inside the first rod portion interior area and an extended configuration substantially outside the first rod portion interior area.

Similarly, the third rod portion 72 may have a configuration complementary to the second rod portion interior area. The third rod portion 72 is operatively coupled to the second rod portion 68 and movable between a retracted configuration substantially inside the second rod portion 68 and an extended configuration substantially outside the second rod portion 68. It is understood that the third rod portion 72 is movable through the open end of the second rod portion 68.

With further reference to the cradle of the mirror assembly 81, a mirror support member 32 may include left 34 and right 36 arms configured such that the support member 32 presents a generally U-shaped configuration (FIG. 4-6). Preferably, the mirror 80 is pivotally coupled to respective ends of the mirror support member 32. Each respective end may include a fastener that is pivotally coupled to a side of the mirror 80. The respective ends of the mirror support member 32 and respective pivot fasteners may be opposed from each other so as to define an imaginary horizontal axis such that the mirror may be selectively pivoted by a user about the horizontal axis between a generally straight configuration and a tilted configuration. More particularly, a "straight" configuration refers to the mirror 80 being in a generally vertical orientation (FIG. 1) and such that a user may see her reflection when situated directly in front of the support member 32 whereas a "tilted" configuration refers to the mirror 80 being tilted rearwardly such that a user may see her reflection when positioned at some level above the support member 32. With this mechanical structure, users of different heights are able to orient the mirror 80 appropriately when seated at a dressing table or even when standing at a sink or vanity. It one embodiment, the mirror 80 may have 180 degrees or even 360 degrees of pivotability.

As described above, the light 90 may be fixedly attached to the mirror support member 32 so as not to be selectively adjustable. The light 90 may alternatively be coupled to the upper end of the length-adjustable rod 61. It is understood, however, that in some embodiments, the light 90 may be pivotally coupled to the ends of the support member arms 34, 36 so as to be selectively pivotal with the mirror 80. In one embodiment, the light 90 is a fluorescent light bulb although an incandescent or light emitting diode (LED) may also work.

Further, it understood that a power cord (not shown) may at one end be electrically connected to the fan member 50, and light 90. The power cord may also extend away from the base member 20 and be configured for attachment to an electrical power source, such a wall outlet. It is understood that the electrical components of the fan base and mirror apparatus may be hardwired to a power source, such as may be desirable if the device is wall mounted.

In addition, the base member 20 may also include an auxiliary electrical outlet 48 that is configured to receive an electrical plug from another electrically powered device, such as a hair dryer, curling iron, or the like. Devices that may be plugged into the auxiliary electrical outlet 48 may be referred to hereafter as "auxiliary devices."

In use, the fan base and mirror apparatus 10 may be positioned on a dressing table, vanity countertop, or another flat surface and is supported by the flat bottom of the base member 20. Alternatively, the base member of the apparatus may be mounted to a wall or fixture. The fan member 50 may be moved between the upward and downward directional configurations as described above, depending if the user desires air discharged by the fan member 50 to be directed toward her face or rather toward her neck and torso, respectively. In an embodiment that includes a base member having an intermediate portion rotationally coupled to a lower portion 22, the user may selectively rotate the direction of the fan laterally, i.e. to the left or to the right. This feature may be beneficial where a user desires air flow in the room but does not want air directed toward her body or face.

It is understood that while certain forms of this invention have been described, it is not limited thereto except insofar as such limitations are included in the following claims and allowable functional equivalents thereof.

The invention claimed is:

1. A fan base and mirror support apparatus for use in cooling a user's torso while the user is positioned adjacent the apparatus, comprising:
   a base member having upper and lower portions;
   a support member having a first end coupled to said upper portion of said base member and a second end opposite said first end, said support member extending upwardly from said base member and having a generally vertical configuration;
   a fan member coupled to said base member;
   a mirror assembly operatively coupled to said second end of said support member and vertically displaced from said fan member, said mirror assembly including a mirror that is pivotally movable;
   wherein said fan member is pivotally coupled to said lower portion of said base member with a fastener that defines a horizontal axis such that said fan member is selectively pivotally movable about said horizontal axis between upward, downward, and neutral tilted configurations, wherein said fan member discharges air away from a user's eyes when the user is reflecting in said mirror and said fan member is at said downward tilted configuration.

2. The fan base and mirror support apparatus as in claim 1, further comprising a light proximate to said mirror and electrically connectable to a power source for illuminating said mirror when energized.

3. The fan base and mirror support apparatus as in claim 1, wherein said base member includes an inverted U-shaped configuration having a pair of bottom ends configured to support said base member atop a flat surface.

4. The fan base and mirror support apparatus as in claim 1, further comprising a mounting member coupled to a back surface of said base member and configured to mount said base member to a wall structure.

5. The fan base and mirror support apparatus as in claim 1, wherein said support member has a configuration for being carried by a user.

6. The fan base and mirror support apparatus as in claim 1, wherein said mirror assembly includes a cradle extending upwardly from said second end of said support member and defining a center void, said mirror positioned within said center void and configured to selectively pivot about a horizontal axis.

7. The fan base and mirror support apparatus as in claim 6, wherein said mirror is pivotally coupled to opposite sides of said cradle with a fastener that defines said horizontal axis, said mirror being selectively pivotal 360 degrees about said horizontal axis.

8. The fan base and mirror support apparatus as in claim 6, wherein said cradle has a complete circular configuration.

9. The fan base and mirror support apparatus as in claim 6, wherein said cradle includes a U-shape configuration defining an open upper end.

10. The fan base and mirror support apparatus as in claim 1, wherein said support member is a length-adjustable rod coupled to said upper portion of said base member and extending upwardly therefrom, said length-adjustable rod being selectively movable between expanded and retracted configurations.

11. The fan base and mirror support apparatus as in claim 10, wherein said length-adjustable rod includes:
a first rod portion having a lower end fixedly attached to an upper end of said base portion and an upper end having an open configuration, said first rod portion defining an interior area; and
a second rod portion having a configuration complementary to said first rod portion interior area, said second rod portion being operatively coupled to said first rod portion and movable between a retracted configuration substantially inside said first rod portion interior area and an extended configuration substantially outside said first rod portion interior area.

12. The fan base and mirror support apparatus as in claim 11, wherein said first rod portion is coupled to said second rod portion with a first friction fastener configured to selectively hold said second rod portion at a relative position relative to said first rod portion.

13. A fan base and mirror support apparatus for use in cooling a user's torso while the user is positioned adjacent the apparatus, comprising:
a base member having upper and lower portions;
a support member having a first end coupled to said upper portion of said base member and a second end opposite said first end, said support member extending upwardly from said base member and having a generally vertical configuration;
a fan member coupled to said base member;
a mirror assembly operatively coupled to said second end of said support member and vertically displaced from said fan member, said mirror assembly including a mirror that is pivotally movable; and
a suction cup coupled to said support member.

14. A fan base and mirror support apparatus for use in cooling a user's torso while the user is positioned adjacent the apparatus, comprising:
a base member having upper and lower portions;
a support member having a first end coupled to said upper portion of said base member and a second end opposite said first end, said support member extending upwardly from said base member and having a generally vertical configuration;
a fan member coupled to said base member;
a mirror assembly operatively coupled to said second end of said support member and vertically displaced from said fan member, said mirror assembly including a mirror that is pivotally movable;
a mounting arm having a proximal end pivotally coupled to one of said base member or said support member and a distal end configured for mounting to a wall structure, said mounting arm being movable between a retracted configuration at which said proximal and distal ends of said mounting arm are proximate said base member or support member and a deployed configuration at which said distal end of said mounting arm is displaced from said base member or support member.

* * * * *